(12) United States Patent
Kumar

(10) Patent No.: US 8,285,753 B2
(45) Date of Patent: Oct. 9, 2012

(54) CHANGE APPROVALS FOR COMPUTING SYSTEMS

(75) Inventor: Apurva Kumar, Noida (IN)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 12/061,794

(22) Filed: Apr. 3, 2008

(65) Prior Publication Data

US 2008/0189256 A1   Aug. 7, 2008

Related U.S. Application Data

(63) Continuation of application No. 11/567,803, filed on Dec. 7, 2006, now Pat. No. 7,562,075.

(51) Int. Cl.
*G06F 17/30* (2006.01)

(52) U.S. Cl. .................. 707/802; 707/791; 709/203

(58) Field of Classification Search .......... 709/203, 709/211, 224, 226; 707/791, 802
See application file for complete search history.

(56) References Cited

U.S. PATENT DOCUMENTS

| | | | |
|---|---|---|---|
| 5,864,852 A | 1/1999 | Luotonen | |
| 6,564,370 B1 | 5/2003 | Hunt | |
| 6,665,674 B1 | 12/2003 | Buchanan et al. | |
| 6,732,160 B2 | 5/2004 | Ambrosini et al. | |
| 6,769,011 B1 | 7/2004 | Desrochers et al. | |
| 7,313,598 B1 * | 12/2007 | Sheth | 709/211 |
| 2002/0078032 A1 | 6/2002 | Shi et al. | |
| 2003/0212863 A1 | 11/2003 | Ganguli et al. | |
| 2005/0080886 A1 | 4/2005 | Croy et al. | |
| 2005/0135341 A1 | 6/2005 | Kim | |

FOREIGN PATENT DOCUMENTS

| | | |
|---|---|---|
| EP | 1009130 | 6/2000 |
| WO | 2006108815 | 10/2006 |

OTHER PUBLICATIONS

Phatak, S.H., et al, "Web &: an Architecture for Non-Interactive Web," Proc. Second IEEE Workshop on Internet Applications, WIAPP, 2001.
Dykes, S.G., et al, "A Viability Analysis of Cooperative Proxy Catching," Twentieth Joint Conference of the IEEE Computer and Communications Societies, in Pro. IEEE, vol. 3, pp. 1205-1214, Apr. 2001.
Lightweight Directory Access Protocol (v3): Technical Specification, RFC 3377, http://www/iwrf.org/rfc/rfc3377.txt (Sep. 2002).
RFC 2251: http://www.ietf.org/rfc/rfc2251.txt (Dec. 1997).
RFC 2252: http://www.ieff.org/rfc/rfc2252.txt (Dec. 1997).
X.500 ITU-T Recommendation: Open Systems Interconnection—The Directory: Overview of Concepts, Models and Services, X.518 | 9594, Part 4: Procedures for Distributed Operations, 2001.

(Continued)

*Primary Examiner* — Huawen Peng
(74) *Attorney, Agent, or Firm* — Gibb & Riley, LLC

(57) ABSTRACT

A proxy directory server discovers the topology of distributed directory server immediately after starting up and before accepting client requests. Immediately after starting up, the proxy server executes queries to extract the structured data corresponding to directory distribution information from the distributed directory servers. Dynamic topology reconfiguration of the distributed directory is achieved by any dynamic configuration changes made to the topology information directly at the proxy during operation being propagated by means of directory update operations to the distributed directory servers.

25 Claims, 4 Drawing Sheets

OTHER PUBLICATIONS

Smith M. et al., "Persistent Search: A Simple LDAP Change Notification Mechanism," draft-ietf-idapext-psearch-xx.txt (Nov. 2000).
Megginson, R. et al., "LDAP Client Update Protocol," draft-ietf-ldup-lcup-xx.txt (Aug. 2003).
Zeilenga K.D., Choi J., "The LDAP Content Synchronization Operation," Internet Draft, draft-xeilenga-ldup-sync-xx.txt (Sep. 2004).
IN920050041CN1, Chinese Office Action dated Oct. 25, 2010, 4 pages.

* cited by examiner

CHANGE APPROVALS FOR COMPUTING SYSTEMS

CROSS-REFERENCE TO RELATED APPLICATIONS

This application is a continuation of U.S. Pat. No. 7,562,075, Issued Jul. 14, 2009, the complete disclosure of which, in its entirety, is herein incorporated by reference.

FIELD OF THE INVENTION

This invention relates to a method, proxy server, and proxy directory system for a distributed directory with proxy.

BACKGROUND

Introduction

Directories are specialized databases, optimized for read access, with the ability to store information about heterogenous real world entities (like people, resources, policies, services, applications etc.) in a single instance making them a critical component of an enterprise's security and identity management framework. Typically, directories consist of a Directory Information Tree (DIT) of entries. By way of example, the standard way of accessing directories over the internet is LDAP (Lightweight Directory Access Protocol (v3): Technical Specification, RFC 3377. http://www.ietf.org/rfc/rfc3377.txt), which allows distribution of a DIT over multiple servers. LDAP supports distributed processing of directory operations using a referral mechanism. Each server contains a subtree of entries, referred to as a naming context, and references to other servers containing related contexts. When a client request cannot be completely answered by a server, the server returns a referral for another server to the client. A disadvantage is that the operation processing slows down to a significant extent.

LDAP Protocol and Support for Distributed Directories

LDAP is the standard means of accessing directories conforming to the X.500 information model over TCP/IP. LDAP v3, as defined by RFC 2251, 2252 (http://www.ietf.org/rfc/rfc2251.txt and http://www.ietf.org/rfc/rfc2252.txt), specifies the information, naming, and security model, in addition to the functional model used for accessing directories.

LDAP Information and Naming Model

LDAP assumes the existence of one or more directory servers jointly providing access to a DIT, which consists of entries. An entry is defined as a set of attribute value pairs with the required object class attribute determining its mandatory and optional attributes. Each entry has a distinguished name (DN) belonging to a hierarchical namespace. The root of the DIT has a "null" DN. FIG. 1 shows an example directory tree 10 and with an inetOrgPerson [RFC 2798] entry. Each node (represented as a circle) is named with its relative DN (RDN). The DN of an entry is constructed by prefixing its RDN to its parent's DN.

Functional Model

The functional model [RFC 2251] adopted by LDAP is one of clients performing protocol operations against servers. LDAP defines three types of operations: query operations, like search, compare, update operations like add, modify, delete, modify DN (entry move) and connect/disconnect operations like bind, unbind, abandon. Add and delete operations are used to add/delete individual entries to/from the directory. A modify operation can be used to add, delete or replace one or more values for one or more attributes of an entry.

Since directories are optimized for read access, the most common LDAP operation is search, which provides a flexible means of accessing information from the directory. The LDAP search operation (also referred as a query) consists of the following parameters which represent the semantic information associated with a query: (i) base: A DN that defines the starting point of the search in the DIT, (ii) scope: {BASE, SINGLE LEVEL, SUBTREE}, specifies how deep within the DIT to search from the base, (iii) filter: A boolean combination of predicates using the standard operators: AND (&), OR (|) and NOT (!), specifying the search criteria, (iv) attributes: Set of required attributes from entries matching the filter. The special value "*" corresponds to selecting all user attributes. Every entry in the directory belongs to at least one (object) class, thus the filter (objectclass=*) matches all entries in the directory. LDAP filters are represented using the parentheses prefix notation of RFC 2254[3], e.g.: (&(sn=Doe)(givenName=John)). Examples of predicates are: (sn=Doe), (age>30), (sn=smith*) where "Doe", "30" and "smith*" are assertion values representing equality, range and substring assertions, respectively.

Distributed Directory Model

LDAP supports partitioning a directory into multiple servers with each server holding one or more naming contexts. A naming context is a subtree of the DIT rooted at an entry, known as its suffix and terminated by leaf entries or special referral objects. Referral objects point to servers holding other subordinate naming contexts. In addition to these subordinate referrals which point down the DIT, servers are also configured with a superior (or default) referral which points upwards in the DIT to a server closer to the DIT root. When encountered, referral objects are used to generate referral messages for the client. A referral message contains LDAP URLs of the form ldap://<host>:<port>/<DN> where DN is the suffix of the naming context being pointed to and host is the fully qualified domain name or IP address of the server containing the naming context. The client progresses the operation by contacting the referred server(s).

Before any directory operation can be performed, its target object (e.g. base of a search request) has to be located. In a distributed directory this is referred to as distributed name resolution. In general, distributed name resolution proceeds up the DIT via default referrals until either the root or a naming context having a suffix which is an ancestor of the target object is encountered. After this, distributed name resolution proceeds down the DIT via subordinate referrals until the target object is encountered. Once the target has been resolved, the operation evaluation phase starts at the server where the target was found. A subtree scoped search, which encounters a subordinate referral during evaluation phase sends a referral message to the client to progress the operation.

FIG. 2 shows a system 20 having three servers the hostA 22, the hostB 24, and the hostC 26 collectively serving the o=xyz namespace. The hostA 22 contains a single naming context with suffix as o=xyz, and contains all the entries under o=xyz except entries under the c=in and ou=research, c=us subtrees which are held by subordinate servers hostC 26 and hostB 24, respectively. The client 28 requests a subtree search with base as o=xyz from the hostB 24. Since the hostB 24 does not contain the target, it refers the client to the hostA 22 using its default referral. The client 28 contacts the hostA 22 which contains the target object. The hostA 22 performs the search against the partition it holds and returns three matching entries and referrals (for the hostB 24 and the hostC 26 for subordinate naming contexts) to the client. Finally the client 28 sends search requests (with modified bases) to the hostB 24 and the hostC 26 which return the remaining entries. Four round trips are required between client and the servers to evaluate one request. In the worst case the total rounds of messages exchanged between the client and the servers are nearly twice the number of servers. This example illustrates why the referrals based distributed query evaluation mechanism in LDAP is slow.

Other Solutions

One way to eliminate referrals is to use chaining of directory requests as described in X.500 ITU-T recommendation: Open Systems Interconnection—The Directory: Overview of concepts, models and services, X.518|9594, Part 4: Procedures for Distributed Operations. In this approach, instead of sending a referral back to the client, the server 'chains' the request to the referred server and forwards the results to the client. However, chaining in general can be inefficient if the client requests a target entry which is not contained in the server. In such cases resolution of the entry DN is required and the chain could involve a large number of servers, thus requiring the results to flow between several servers before reaching the client. This results in unnecessary server to server communication.

A better way of eliminating referrals is by having a directory proxy (hereinafter referred to as a 'proxy') at the front end of the distributed directory. The proxy is typically located between the client and distributed directory servers. The proxy may function as a server intercepting client request or may function as a client to the distributed directory server to evaluate the queries. The proxy has knowledge of how the naming contexts in the directory are mapped to servers in the distributed environment. A proxy configured with this directory topology information then can be used to distribute a client operation into sub-operations (if required), route the request to appropriate servers, and send the consolidated results to the client. Current proxy directory solutions (e.g. 'proxy directory' of the open-source OpenLDAP server http://www.openldap.org) are based on configuring the proxy with topology information.

A disadvantage associated with using such static configuration of partition information at the proxy is that each server constituting a distributed directory has its own management interface which allows adding/removing of naming contexts under it. The directory protocols do not provide support for notification of updates to a client (or in this case, the proxy). A further disadvantage is that there is no central means to make changes to the distributed directory configuration. For example, a configuration change in the directory setup may require changes at multiple directory servers. A further disadvantage with the current solutions is that it becomes increasingly difficult to manage the distributed directory leading to incorrect evaluation of directory queries due to topology information at the proxy.

SUMMARY

It is an object of the present invention to provide a method, proxy server, and proxy directory system that adapts to dynamic topology changes in an associated distributed directory without any disruption in proxy services offered to clients.

A further object of the invention is to provide a method, proxy server, and proxy directory system to support centralized management of certain configuration properties (termed as dynamic reconfiguration) of the distributed directory servers through the proxy server.

The invention makes use of the fact that common implementations of directory standards store directory distribution information (like partitioning and replication) as structured data (i.e., data which conforms to a directory schema) in the directory servers, which participates in the distributed directory service.

The invention provides a two way synchronization between topology information stored at the proxy and the actual distributed directory topology. The 'online' behaviour of the proxy with respect to topological changes is achieved by implementing topology discovery and topology adaptation which provides a one-side synchronization. Additionally, dynamic topology reconfiguration can be implemented which provides synchronization in the other direction.

In accordance with an embodiment, the proxy directory server is configured to discover the topology of the distributed directory servers immediately after starting up and before accepting client requests. Advantageously, the proxy directory server is not configured with the topology information. Instead, it is configured with connection information to each of the distributed directory servers to which it is expected to provide the proxy service. Immediately after starting up, the proxy directory server executes certain special queries to extract the structured data corresponding to directory distribution information from the distributed directory servers.

Dynamic topology reconfiguration of the distributed directory is achieved through the proxy server as follows: any dynamic configuration changes made to the topology information directly at the proxy directory server during operation are propagated by means of directory update operations to the distributed directory servers. These update operations apply to the same structured data in the distributed directory servers which were discovered in the topology discovery phase.

The discovered topology information is kept current by keeping the filters of the proxy server corresponding to the special queries synchronized with the distributed directory servers.

DETAILED DESCRIPTION

Overview

Figure 3:
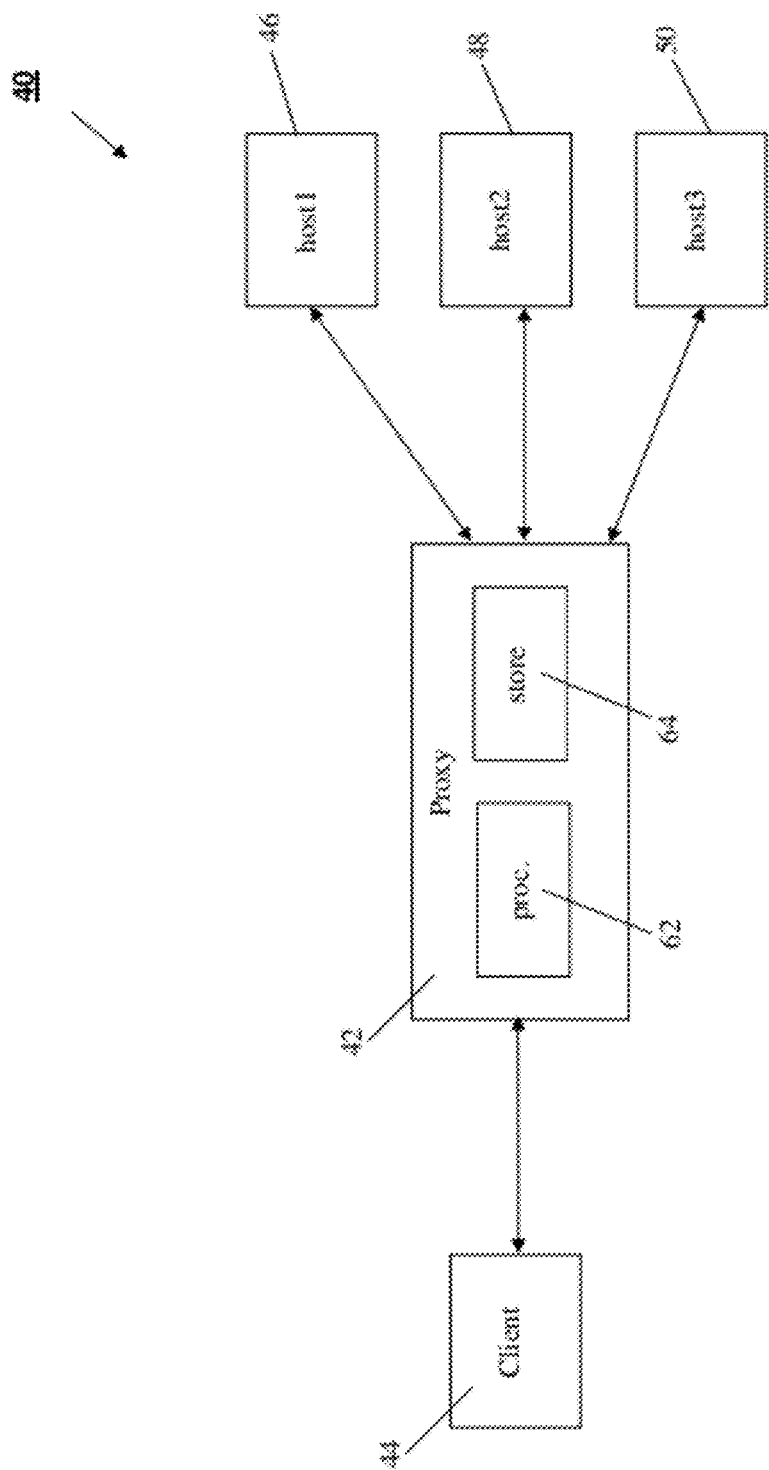
FIG. 3 is a schematic block diagram of a proxy directory system.

FIG. 3 shows a proxy directory system 40. The system 40 firstly includes a proxy directory server 42. The proxy directory server 42 is connected with a client server 44, and receives directory requests (client requests) from the client server 44. The proxy directory server 42 also is connected with a plurality of directory servers 46, 48, 50 identified as host1, host2, and host3, respectively. The proxy directory server 42 routes client requests to the appropriate directory server 46, 48, 50. The proxy directory server 42 also includes a processor 62 and a data store 64, the function of which will be described below.

Discovering Directory Topology

The proxy directory server 42 requires the following topological information to be able to route client requests:
- (i) mapping of naming contexts to servers
- (ii) determining which servers master a replicated context.

Figure 1:
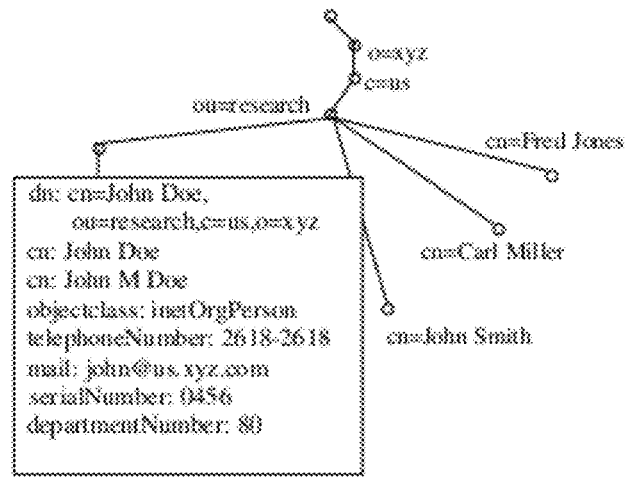
FIG. 1 shows an example known LDAP Directory Information Tree and related entries.
Figure 2:
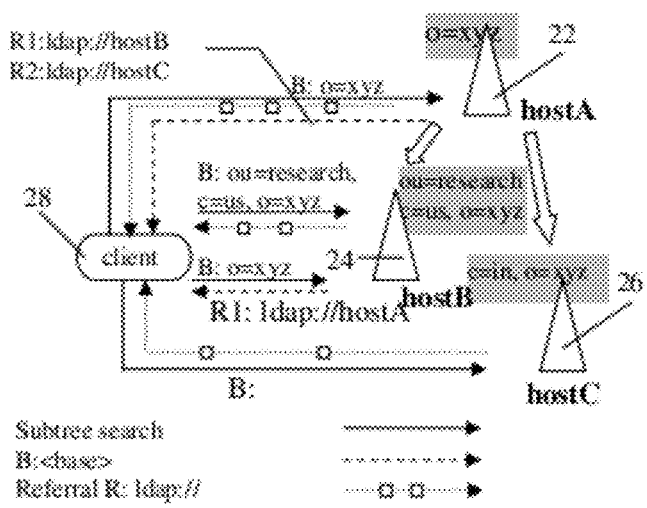
FIG. 2 shows a typical server system for distributed query processing.

The proxy directory server 42 performs the following steps to map naming contexts to servers:

1. The proxy directory server 42 stores in the data store 64, connection information (credentials) for directory servers 46, 48, 50. In one example, this information is a URL (LDAP URL), a distinguished name (DN) and a password. At startup, the processor 62 of the proxy directory server 42 uses the connection information to connect (using e.g. LDAP bind requests) to directory servers 46, 48, 50.
2. If all directory server connections were successful, a boolean local variable partial_results is set to FALSE. Otherwise, partial_results is set to TRUE. For each of the directory servers 46, 48, 50 that could not be contacted, a request is sent in predefined intervals of "Tretry_interval" until a limiting value of attempts defined as "Tretry_limit" is reached.
3. For each of the successful directory connections, the proxy directory server 42 sends a query to obtain the naming contexts being held at the directory server(s) 46, 48, 50. For LDAP directories, the proxy directory server 42 can send an LDAP search request with base: " ", scope: base, filter: (objectclass=*), attrs: {namingcontexts}. This query retrieves the value of the namingcontexts attribute from the root of the subtree. This attribute is multivalued and an example of its values could be: cn=users, dc=xyz, dc=com and cn=groups, dc=xyz, dc=com.
4. The value of the namingcontexts attribute provides the root of the naming contexts held at each of the directory servers 46, 48, 50 to the proxy directory server 42. However, a naming context might not be a complete subtree of entries if it terminates in referral entries. To retrieve referral entries a separate query is sent for each value of the naming context attribute returned by a directory server 46, 48, 50. The LDAP query, base: "<naming context value>, scope: subtree, filter: (objectclass=referral), attrs: ref can be used to retrieve all referral URLs.
5. Once the naming contexts defined in the directory servers 46, 48, 50 have been completely discovered, a routing table is created (and stored in the data store 64) using this information. The routing table maps unique naming contexts in directory servers 46, 48, 50 to server hostnames containing those namingcontexts. A naming context is completely defined by its root and zero or more referrals. For FIG. 2, the naming contexts vs. servers tables will be as follows:

TABLE 1

| | Naming context | |
|---|---|---|
| Root | Referrals | Servers |
| o = xyz | ou = research, c = us, o = xyz<br>c = in, o = xyz | Host A |
| ou = research, c = us, o = xyz | — | Host B |
| c = in, o = xyz | — | Host C |

In the absence of replication (as in the example above), the routing table will have a one to one mapping between naming contexts and directory servers. In case of replication, multiple directory servers (i.e., servers 46, 48, 50) could contain a given naming context. While this table can be used to route read only client requests at the proxy directory server 42, a separate table for update operations is required since this table does not contain the master information.

6. The unit of replication in directories is a naming context. Typically, details of the replication agreement (between directory servers) are stored in a sub entry or attribute associated with the root entry of the replicated naming context. A query similar to the one used for retrieving referrals can be used to retrieve the attribute from replication agreement which specifies whether the directory server containing a naming context is a master or slave for that particular namingcontext attribute.
7. Once the master/slave information is available a new routing table is constructed which maps naming contexts to the directory servers 46, 48, 50 which 'master' that naming context. This table can be used by the proxy 42 to route update requests from clients 44.

In the foregoing, connection information refers to the credentials (e.g. username, password or an X.509 certificate) that are required by a proxy directory server 42 (or a client) to authenticate and set up communication with the directory servers 46, 48, 50.

On the other hand, topology information is the knowledge of how a directory is partitioned between multiple servers. Advantageously, the proxy directory server 42 disclosed herein is configured only with connection information. The proxy directory server 42 discovers the topology information by querying the distributed directory servers, as described in steps 3, 4, and 6 above.

The example embodiment provides topology discovery and synchronization at a proxy directory server 42. Topology information is an example of meta-information stored at the proxy directory server 42. Therefore, the proxy directory server's main function is to route client requests, thus topology information is the only meta-information considered.

Adapting to Changing Topology

The proxy directory server 42 can use one of the following two approaches to adapt to a changing topology of the distributed directory servers 46, 48, 50:

(i) Send the topology queries (for naming contexts, referrals and replication agreements) to the directory servers 46, 48, 50 periodically, i.e. polling the directory servers for change in topology.

(ii) If the directory servers supports a persistent mode of querying (where a connection is not closed after query results are sent and any changes to the content are subsequently sent on the same connection) then the topology queries are performed using the persistent mode. In this mode the directory servers 46, 48, 50 notify the proxy directory server 42 of topological changes.

Using either of these modes, the following topological changes can be detected at a proxy directory server 42.

(i) a naming context is added to a directory server (ii) a naming context is deleted from a directory server (iii) a naming context is modified on a directory server.

Case (iii) is equivalent to removing a naming context and adding another naming context, and will not be considered separately.

Adding a Naming Context

When a new naming context is added at a directory server 46, 48, 50 there are three possibilities:

(i) the naming context exists on another directory server (ii) no part of the naming context overlaps with an existing naming context (iii) some part of the naming context overlaps with one or more existing directory servers.

If a new naming context with root DN as root and referral list as Refs is discovered at the host called server, the routine ADDCONTEXT (given below) can be used to update the routing information. "DnForest" is a collection of trees where each node of a tree represents a naming context.

Each node contains the following fields:

dn: the distinguished name of the root of the naming context

ServerList: list of servers having that naming context

Leftchild: points to the first subordinate naming context

Rightchild: points to peer naming contexts.

Figure 4:
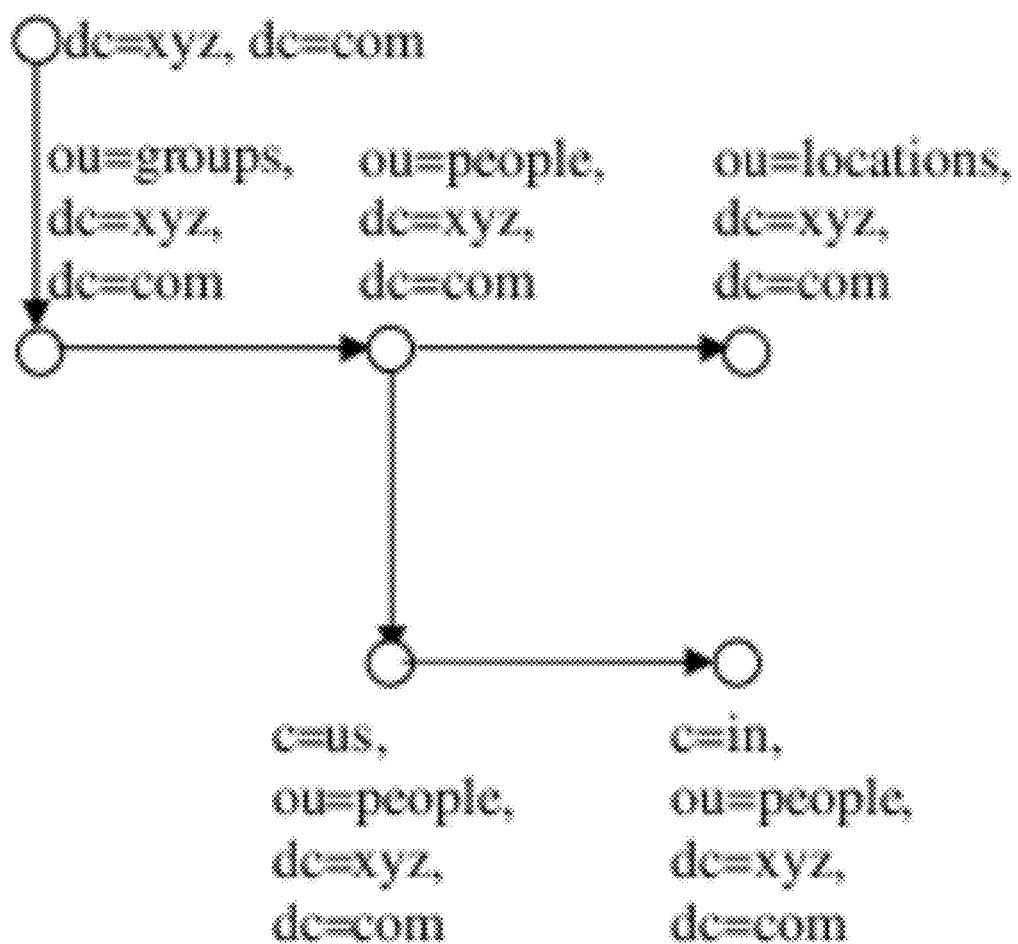
FIG. 4 shows six naming contexts represented as a binary tree.

FIG. 4 shows six naming contexts (represented by circles) represented as a binary tree. The name of a node is the root of the corresponding naming context. A naming context has one or more referrals if leftchild is not NIL. The right child is used to point to other referrals in a referral chain.

| Routine ADDCONTEXT |
|---|
| ADDCONTEXT(root, Refs, server, DnForest) { |
| 1    r = head[Refs] |
| 2    for each tree T in DnForest |
| 3      if (dn[root[T]] == dn[root]) |
| 4        ServerList[root[T]] = (ServerList[root[T]], server) |
| 5        break |
| 6      if (ISSUFFIX(root[T], root)) |
| 7        INSERT(root, root[T], 1, server) |
| 8        while (r != NIL) |
| 9          INSERT(r, root[T], 0, server) |
| 10        r = next[r] |
| 11        return |
| 12    INITTREE(NewTree) |
| 13    x = root[NewTree] = root |
| 14    left[x] = r |
| 15    ServerList[x] = (ServerList[x], server) |
| 16    while (r != NIL) |
| 17      INSERT(r, NewTree, 0, server) |
| 18      r = next[r] |
| 19    DnForest = (DnForest, NewTree) |
| } |

Explanation:

ISSUFFIX(x, y) returns TRUE if x is an ancestor of y, FALSE otherwise.

INITTREE(T): initializes a tree.

Lines 2-11: It loops over each naming context tree in the forest DnForest. For each tree T it determines whether the root of naming context to be added either matches or is a descendant of the root of the tree. If yes, then it inserts the root of the naming context and its referrals into T using the function INSERT (given below).

Lines 12-19: If no such tree is found (in which the root of the naming context can be inserted), then a new naming context tree, NewTree, containing the naming context is created and added to the list of trees (DnForest).

Consider the following routine.

| Routine INSERT |
|---|
| INSERT(x, y, isroot, server) { |
| 1    if (z = leftchild[y] == NIL) |
| 2      leftchild[y] = x |
| 3    INITLIST(DescList) |
| 4    INITLIST(PeerList) |
| 5    while (z != NIL) |
| 6      if (dn[x] == dn[z]) |
| 7        if (isroot) |
| 8          ServerList[z] = (ServerList[z], server) |
| 9        return |
| 10      if (ISSUFFIX(x,z)) |
| 11        Add z to DescList |
| 12      else if (ISSUFFIX(z,x)) |
| 13        if (!isroot) |
| 14          ServerList[z] = (ServerList[z], server) |
| 15        INSERT(x, z, isroot, server) |
| 16        return |
| 17      else PeerList = (PeerList, z) |
| 18      z = rightchild[z] |
| 19    leftchild[y] = x |
| 20    ServerList[x] = (ServerList[y], server) |
| 21    leftchild[x] = head[DescList] |
| 22    rightchild[x] = head[PeerList] |
| 23    return y |
| } |

Explanation:

INSERT(x, y, isroot, server) inserts a node x in the subtree below y. If the node being inserted is the root of naming context, isroot is set to TRUE, server is the host containing the naming context.

INITLIST: initializes a list.

Lines 1-2: If there are no nodes below y, place x under y by making it leftchild of y.

Lines 5-18: Iterates through the subordinate contexts of y and compares the node being added with roots of the subordinate contexts. Lines 6-9 handle the case when node being added already exists (case 1). In this case, if the node being added is root of a context, then the server containing the naming context is added to the ServerList of the context. Lines 10-11 handle the case when x is an ancestor of a subordinate context of y (case 2). Lines 12-16 handle the case when x is a descendant of a subordinate context of y (case 3). This involves a recursive call to INSERT. Line 17 handles the remaining case (case 4). For case 2 and 4, lines 19-22 actually do the node insertion.

Removing a Naming Context

Removing a naming context is performed by the following routine.

| Routine REMOVECONTEXT |
|---|
| REMOVECONTEXT (root, Refs, server, DnForest) { |
|     r = head[Refs] |
|     for each tree T in DnForest |
|       if (dn[root[T]] == dn[root]) |
|         Remove server from ServerList[root[T]] |
|         If (length[ServerList[root[T]] == 0) |
|           root[T] = leftchild[T] |
|         break |
|       if (ISSUFFIX(root[T], root)) |
|         REMOVE(root, root[T], 1, server) |
|         while (r != NIL) |
|           REMOVE(r, root[T], 0, server) |
|           r = next[r] |
|         return |

-continued

Routine REMOVECONTEXT

```
}
REMOVE(x, y, isroot, server) {
    z = leftchild[y]
    prev = y
    while (z != NIL)
        if (dn[x] == dn[z])
            if (isroot)
                Remove server from ServerList[z]
                if (length[ServerList[z]] == 0)
                    if (prev == y)
                        leftchild[prev] = leftchild[z]
                    else
                        rightchild[prev] = leftchild[z]
                        Append peers of leftchild[z] to peers of z
            return
        if (ISSUFFIX(z,x))
            REMOVE(x, z, isroot, server)
            return
        z = rightchild[z]
    }
}
```

Explanation:

The routines REMOVECONTEXT and REMOVE are analogous to the ADDCONTEXT and INSERT. The description of arguments is identical except that root, Refs refer to the naming context to be removed.

Dynamic Topology Reconfiguration

The connection information configured at the proxy directory server 42 can be stored as structured data and can be modified during operation. This allows adding/deleting new servers to be proxied by adding/removing connection information for the directory servers 46, 48, 50. The proxy directory server 42 periodically checks for changes in the connection information and connects/reconnects to distributed directory servers 46, 48, 50 for which the connection information has been added/modified.

Apart from dynamically adding and removing directory servers 46, 48, 50 from the proxy configuration, topological changes in the distributed directory through the proxy 42 can also be made. If a topology configuration change is required in the distributed directory servers 46, 48, 50, then instead of manually incorporating changes in multiple directory servers, changes can be made directly to the topology information stored at the proxy directory server 42. The proxy directory server 42 then uses directory update operations like add, delete, and modify to make corresponding updates to the structured data at the distributed directory servers.

Computer Platform

Figure 5:
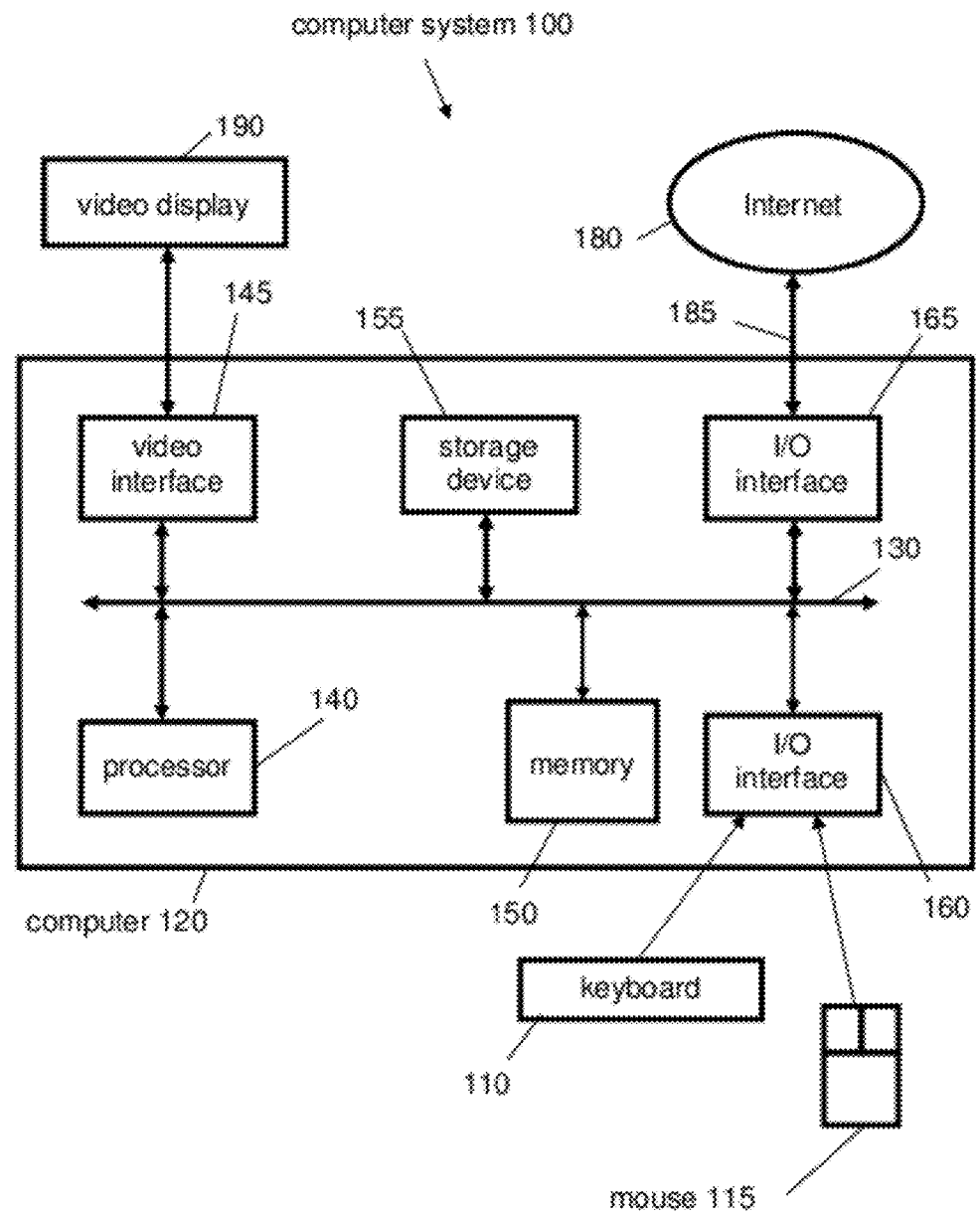
FIG. 5 is a schematic block diagram of a computer system that can be used to implement the generator, architecture and method of FIGS. 1 to 4.

FIG. 5 shows a schematic block diagram of a computer system 100 that can be used to practice the methods described herein. More specifically, the computer system 100 is provided for executing computer software that is programmed to generate lexemes from program code, and to generate code change descriptions between two or more code bodies. The computer software executes under an operating system such as MS Windows 2000™, MS Windows XP™ or Linux™ installed on the computer system 100.

The computer software involves a set of programmed logic instructions that may be executed by the computer system 100 for instructing the computer system 100 to perform predetermined functions specified by those instructions. The computer software may be expressed or recorded in any language, code or notation that comprises a set of instructions intended to cause a compatible information processing system to perform particular functions, either directly or after conversion to another language, code or notation.

The computer software program comprises statements in a computer language. The computer program may be processed using a compiler into a binary format suitable for execution by the operating system. The computer program is programmed in a manner that involves various software components, or code, that perform particular steps of the methods described hereinbefore.

The components of the computer system 100 comprise: a computer 120, input devices 110, 115 and a video display 190. The computer 120 comprises: a processing unit 140, a memory unit 150, an input/output (I/O) interface 160, a communications interface 165, a video interface 145, and a storage device 155. The computer 120 may comprise more than one of any of the foregoing units, interfaces, and devices.

The processing unit 140 may comprise one or more processors that execute the operating system and the computer software executing under the operating system. The memory unit 150 may comprise random access memory (RAM), read-only memory (ROM), flash memory and/or any other type of memory known in the art for use under direction of the processing unit 140.

The video interface 145 is connected to the video display 190 and provides video signals for display on the video display 190. User input to operate the computer 120 is provided via the input devices 110 and 115, comprising a keyboard and a mouse, respectively. The storage device 155 may comprise a disk drive or any other suitable non-volatile storage medium.

Each of the components of the computer 120 is connected to a bus 130 that comprises data, address, and control buses, to allow the components to communicate with each other via the bus 130. The computer system 100 may be connected to one or more other similar computers via the communications interface 165 using a communication channel 185 to a network 180, represented as the Internet.

The computer software program may be provided as a computer program product, and recorded on a portable storage medium. In this case, the computer software program is accessible by the computer system 100 from the storage device 155. Alternatively, the computer software may be accessible directly from the network 180 by the computer 120. In either case, a user can interact with the computer system 100 using the keyboard 110 and mouse 115 to operate the programmed computer software executing on the computer 120.

The computer system 100 has been described for illustrative purposes. Accordingly, the foregoing description relates to an example of a particular type of computer system such as a personal computer (PC), which is suitable for practicing the methods and computer program products described hereinbefore. Those skilled in the computer programming arts would readily appreciate that alternative configurations or types of computer systems may be used to practice the methods and computer program products described hereinbefore.

Embodiments of methods, systems and computer program products have been described hereinbefore relating to the comparison of standard and deployed program code to generate code change descriptions. The foregoing detailed description provides exemplary embodiments only, and is not intended to limit the scope, applicability or configurations of the invention. Rather, the description of the exemplary embodiments provides those skilled in the art with enabling descriptions for implementing an embodiment of the invention. Various changes may be made in the function and arrangement of elements without departing from the spirit and scope of the invention as set forth in the claims hereinafter.

Where specific features, elements and steps referred to herein have known equivalents in the art to which the invention relates, such known equivalents are deemed to be incorporated herein as if individually set forth. Furthermore, features, elements and steps referred to in respect of particular embodiments may optionally form part of any of the other embodiments unless stated to the contrary.

I claim:

1. A computer-implemented method for configuring a proxy directory server proxying for a plurality of distributed directory servers, said method comprising:
   storing, by a computing device, connection information on said proxy directory server;
   connecting, by said computing device, said proxy directory server with a client server and one or more of said plurality of distributed directory servers using said connection information;
   for successfully connected ones of said plurality of distributed directory servers, executing, by said computing device, queries to said distributed directory servers to extract structured data from said distributed directory servers to said proxy directory server, said structured data comprising:
   a value of naming contexts attributes from a root of a subtree;
   a referral Uniform Resource Locator (URL) when any of said naming contexts attributes ends in a referral entry; and
   an attribute from a replication agreement which specifies whether a distributed directory server containing a naming context is one of a master and a slave for that particular naming context attribute;
   producing, by said computing device, topology information from said structured data for routing client requests, said topology information including a mapping of said naming contexts to said distributed directory servers, and identification of particular distributed directory servers that master replicated context; and
   based on said topology information, said proxy directory server performing:
   distributing, by said computing device, a client operation into a plurality of sub-operations to connected ones of said plurality of distributed servers;
   routing, by said computing device, a client request to appropriate ones of said plurality of distributed servers; and
   sending, by said computing device, consolidated results from ones of said plurality of distributed directory servers to said client.

2. The method of claim 1, said connection information comprising a Universal Resource Locator, a distinguished name and a password.

3. The method of claim 1, said structured data for each said connected distributed directory server comprising a mapping of naming contexts to a respective said distributed directory server and information on which said plurality of distributed directory servers master a replicated context.

4. The method of claim 3, said queries comprising a further separate query for each value of a naming context attribute previously returned by said respective distributed directory server.

5. The method of claim 1, further comprising reconstructing, by said computing device, said topology when changes occur in said results of said queries.

6. The method of claim 5, said occurrence of changes in results being determined by periodically repeating a query.

7. The method of claim 5, said occurrence of changes in results being determined by notification from said plurality of distributed directory servers.

8. The method of claim 1, further comprising dynamically reconfiguring, by said computing device, said distributed directory server topology.

9. The method of claim 8, said reconfiguration being achieved by a directory update operation configured to modify said structured data stored in said plurality of distributed directory servers.

10. The method of claim 9, said updated structured data representing a mapping of naming contexts to a respective said distributed directory server and includes information on which said plurality of distributed directory servers master a replicated context.

11. The method of claim 8, said reconfiguration being achieved by at least one of adding new servers to, and removing existing servers from said plurality of distributed directory servers.

12. The method of claim 1, further comprising:
   modifying said connection information; and
   re-executing said queries to extract structured data corresponding to a reconfigured distributed directory server topology.

13. A proxy directory server comprising:
   a store of connection information; and
   a processor that connects with a client server and a plurality of distributed directory servers using said connection information, and, for successfully connected ones of said distributed directory servers, executes queries to said distributed directory servers to extract structured data from said distributed directory servers to said proxy directory server, said structured data comprising:
   a value of naming contexts attributes from a root of a subtree;
   a referral Uniform Resource Locator (URL) when any of said naming contexts attributes ends in a referral entry; and
   an attribute from a replication agreement which specifies whether a distributed directory server containing a naming context is one of a master and a slave for that particular naming context attribute;
   said processor produces topology information for routing client requests, said topology information including a mapping of said naming contexts to said distributed directory servers and identification of particular distributed directory servers that master replicated context; and
   based on said topology information, said proxy directory server performs:
   distributing a client operation into a plurality of sub-operations to connected ones of said plurality of distributed servers;
   routing a client request to appropriate ones of said plurality of distributed servers; and
   sending consolidated results from ones of said plurality of distributed directory servers to said client.

14. The proxy directory server of claim 13, said connection information comprising a Universal Resource Locator, a distinguished name and a password.

15. The proxy directory server of claim 13, said structured data for each said connected distributed directory server comprising a mapping of naming contexts to a respective said distributed directory server and information on which of said directory servers master a replicated context.

16. The proxy directory server of claim 15, said queries comprising a further separate query for each value of a naming context attribute previously returned by said respective distributed directory server.

17. The proxy directory server of claim 13, said processor reconstructing said topology when changes occur in said results of said queries.

18. The proxy directory server of claim 17, said occurrence of changes in results being determined by periodically repeating a query.

19. The proxy directory server of claim 17, said occurrence of changes in results being determined by notification from said plurality of distributed directory servers.

20. The proxy directory server of claim 13, said processor dynamically reconfigures reconfiguring said distributed directory server topology.

21. The proxy directory server of claim 20, wherein said reconfiguration being achieved by use of directory update operations and configured to modify said structured data stored in said plurality of distributed directory servers.

22. The proxy directory server of claim 21, said updated structure data representing a mapping of naming contexts to a respective said distributed directory server and includes information on which said plurality of distributed directory servers master a replicated context.

23. The proxy directory server of claim 22, said reconfiguration being achieved by at least one of adding new servers to and removing existing servers from said plurality of distributed directory servers.

24. The proxy directory server of claim 13, said processor further modifying said connection information, and re-executes said queries to extract structured data corresponding to a reconfigured distributed directory server topology.

25. A proxy directory system comprising:
a client server;
a proxy directory server including:
 a store of connection information; and
 a processor; and
a plurality of distributed directory servers connected with said proxy directory server; said processor connecting with said client server and said plurality of distributed directory servers using said connection information, and, for successfully connected ones of said distributed directory servers, executing queries to said distributed directory servers to extract structured data from said distributed directory servers to said proxy directory server, said structured data comprising:
a value of naming contexts attributes from a root of a subtree;
a referral Uniform Resource Locator (URL) when any of said naming contexts attributes ends in a referral entry; and
an attribute from a replication agreement which specifies whether a distributed directory server containing a naming context is one of a master and a slave for that particular naming context attribute;
said processor producing topology information from said structured data for routing client requests, said topology information including a mapping of said naming contexts to said distributed directory servers and identification of particular distributed directory servers that master replicated context; and
based on said topology information, said proxy directory server performs:
distributing a client operation into a plurality of sub-operations to connected ones of said plurality of distributed servers;
routing a client request to appropriate ones of said plurality of distributed servers; and
sending consolidated results from ones of said plurality of distributed directory servers to said client.

* * * * *